United States Patent [19]

Mee

[11] Patent Number: 4,929,136

[45] Date of Patent: May 29, 1990

[54] FLOATING MATABLE ELEMENT

[75] Inventor: Francis H. A. Mee, Aurora, Canada

[73] Assignee: Spar Aerospace Limited, Mississauga, Canada

[21] Appl. No.: 324,818

[22] Filed: Mar. 17, 1989

[51] Int. Cl.⁵ .................. F16B 37/08; B25B 13/00; B25G 1/00

[52] U.S. Cl. .................... 411/432; 411/112; 403/144; 81/177.75

[58] Field of Search .............. 411/432, 84, 85, 108, 411/112, 113, 105; 464/120, 125, 126, 169; 81/177.75; 403/138, 144, 146

[56] References Cited

U.S. PATENT DOCUMENTS

| | | | |
|---|---|---|---|
| 1,183,064 | 5/1916 | Emerson | 464/169 |
| 2,194,798 | 3/1940 | Koppel | 464/169 |
| 2,249,923 | 7/1941 | Whitcombe . | |
| 2,396,142 | 3/1946 | Allen | 411/105 |
| 2,820,499 | 1/1958 | Schaaf . | |
| 3,005,292 | 10/1961 | Reiland . | |
| 3,241,591 | 3/1966 | Rosan et al. | 411/108 |
| 3,342,096 | 9/1967 | Bobrowski . | |
| 3,461,937 | 8/1969 | Finney . | |
| 3,640,327 | 2/1972 | Burt . | |
| 3,695,324 | 10/1972 | Gulistan . | |
| 3,765,078 | 10/1973 | Gulistan | 411/112 |
| 4,114,401 | 9/1978 | Van Hoose | 464/120 |
| 4,575,295 | 3/1986 | Rebentisch . | |
| 4,830,557 | 5/1989 | Harris et al. | 411/112 |

FOREIGN PATENT DOCUMENTS

968757  12/1950  France .............. 81/177.75

Primary Examiner—Neill R. Wilson
Attorney, Agent, or Firm—Fetherstonhaugh & Co.

[57] ABSTRACT

The devices are floating engageable means which may be a floating nut or a floating driver for use in hostile environment, such as space. The device includes a housing with a cross-shaped opening, each arm of the cross receiving a wing of a floating member. A spring between the base of the housing and the back of the floating member urges the wings against the top surface of the arms of the cross-shaped opening in the housing. The cross-shaped openings may have a rectangular configuration with a thread surface forming the top surface of the opening. This permits the floating member to maintain a lateral offset. Alternatively, the arms may have a triangular outline with the vertex forming the top surface of the arms. With this configuration, a force will be provided to center the floating member in the housing. The floating member terminates in a an outwardly facing taper guiding surface which tapers to the engaging means of the floating member. With this arrangement, off axis and off angle mating is possible.

23 Claims, 6 Drawing Sheets

FLOATING MATABLE ELEMENT

This invention relates to a compliant engageable apparatus such as a compliant nut.

In construction in hostile environments, such as outer space, it is often difficult to mate two elements. For example, it may be difficult to thread two elements together as it may be problematic to properly align the threads thereof.

Floating nut assemblies are known for use in construction environments. For example, U.S. Pat. No. 3,695,324 issued October 3, 1972 to Gulistan discloses a receptacle having two opposed flanges with openings therethrough for reception of opposed tabs projecting from the base of a nut. The opposed tabs allow the nut bilateral freedom within the receptacle. As well, the tabs have a lesser thickness than the width of the openings in the flanges so that the nut is permitted a limited pivotal movement. Such floating nuts require a bolt be accurately positionable within the nut opening; this is a disadvantage in hostile environments. Further, given an axial misalignment between a bolt and such a nut, rotation of the bolt is intended to engage the threads of the nut and draw the nut into axial alignment with the bolt. However, if the axial misalignment is sufficiently great, rotation of the bolt may improperly mesh the threads of the bolt and nut or may not result in mating at all.

Accordingly, there is a need for a compliant engageable apparatus where the element to be engaged with the engageable apparatus may not be accurately positioned with respect to the engageable apparatus prior to attempting engagement.

According to the present invention there is provided a compliant engageable apparatus comprising: a housing having an opening in its top surface opening and at least two receptors in its side; a floating member received by said housing having a projecting end projecting through said top surface opening and having wings such that a wing is received by each of said receptors, said projecting end having a tapered guide surface, said tapered guide surface tapering to engaging means, and urging means to urge said floating member to a floating position at which said wings abut the surface of said receptors which is proximate the top surface of said housing whereby said floating member has a preset alignment within said housing.

In the figures which illustrate example embodiments of the present invention.

Figure 1:
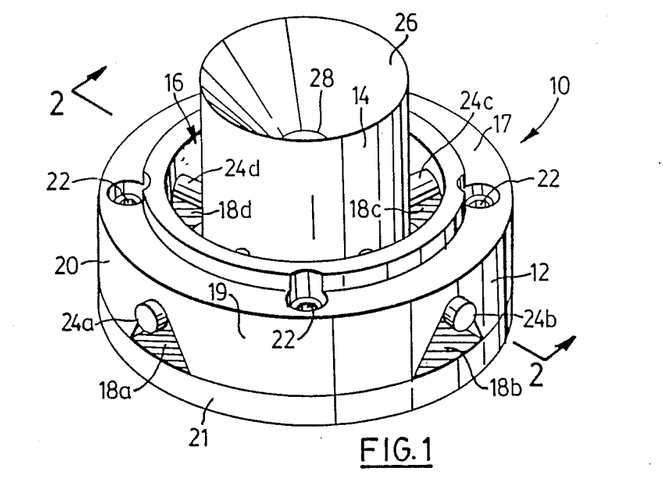
FIG. 1 is perspective view of a compliant engageable apparatus according to this invention.
Figures 2, 3, 4, 6:
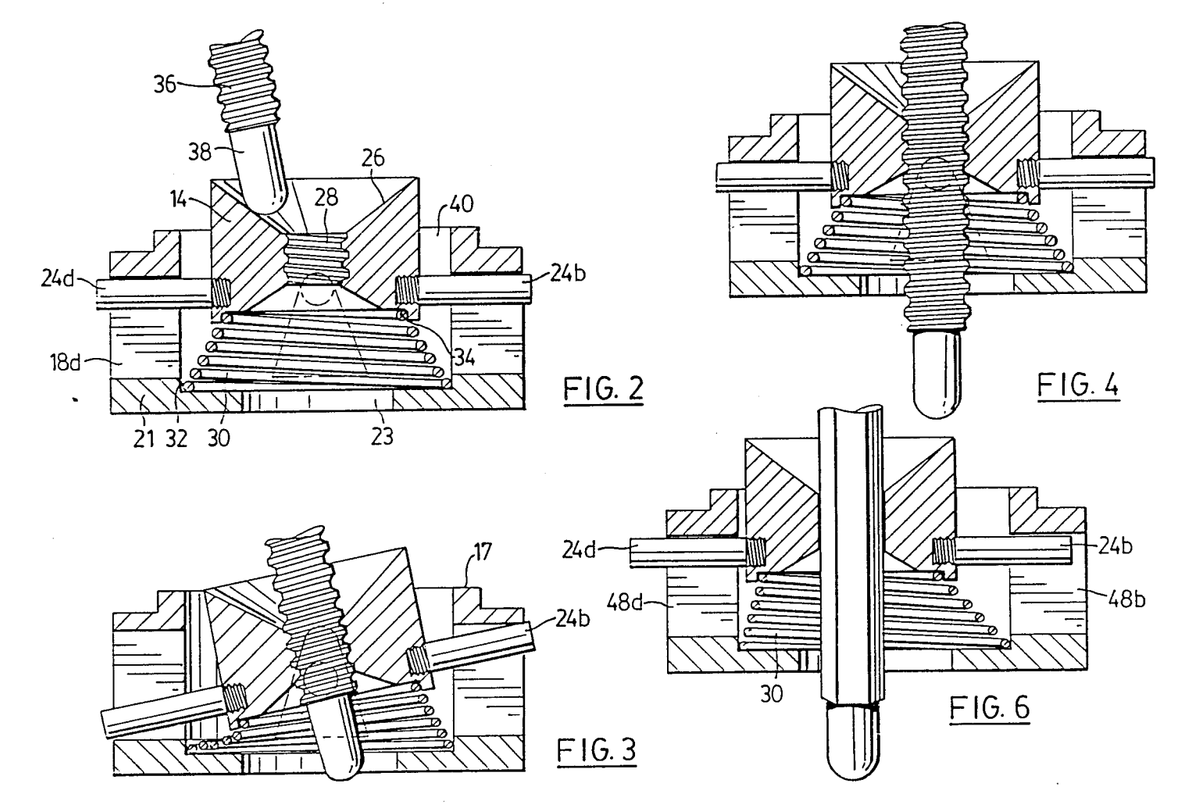
FIG. 2 is a sectional view of the apparatus taken along the lines 2—2 of FIG. 1 and showing the approach of a bolt.
FIG. 3 is a sectional view of the apparatus of FIG. 1 showing the apparatus in operation as a bolt is engaged.
FIG. 4 is a sectional view of the apparatus of FIG. 1 showing a bolt fully engaged.
FIG. 6 is a sectional view taken along the lines 6—6 of FIG. 5 and showing the driver of FIG. 5 engaged with the compliant engageable apparatus.

Turning to FIGS. 1 and 2, the compliant engageable apparatus 10 comprises housing 12 and floating member 14. Housing 12 has an opening 16 through its top surface 17 and side receptors 18a, 18b, 18c, and 18d which are openings through the side 19 of the housing. The housing is formed of two pieces: cylindrical body 20 and base plate 21. Base plate 21 has a central opening 23 therein. Notches in the base of body 20 form the side openings 18a, 18b, 18c, 18d when base plate 21 is joined to body 20 by means of screws 22.

The side openings are equally spaced about the periphery of the housing. Consequently, since there are four peripheral openings, each will be perpendicular to its neighbouring side opening. The peripheral openings are generally triangular in outline with the vertex of each triangular outline forming a surface of the side opening which is proximate the top surface 17 of the housing. Four wings 24a, 24b, 24c and 24d project from the floating member 14. The wings are cylindrical shafts which, are threaded into the floating member.

The floating member terminates in outwardly facing tapered guide surface 26. The guide surface 26 tapers to engaging means 28 which are a threaded opening. The base of a spiral spring 30 is received in a notch 32 in base 21 of the housing. The apex of the spiral spring is received in a notch 34 in the back surface of the floating member. Consequently, this spiral spring 30 urges the floating member to a floating position at which the wings 24a, 24b, 24c, and 24d abut the vertex of the generally triangular side openings. In this position, the floating number has a preset alignment in the housing. In the FIG. 1 embodiment, since the side openings are perpendicular to the cylindrical cavity 40 in the housing, the floating member is aligned with the cylindrical cavity 40, that is, the axis of the floating member is parallel with the axis of the cylindrical cavity. Further, due to the triangular outline of the side openings, when the spiral spring urges the wings against the vertices of the generally triangular side openings, the floating member is positioned at a set lateral position in the top surface opening of the housing, which, in FIG. 1, is the center of the top surface opening 17.

The compliant engageable apparatus of FIGS. 1 and 2 has particular application when it is desired to join two parts, one of which is joined to the compliant engageable apparatus and the other of which is joined to a driver, which is a bolt such as that shown at 36 in FIG. 2. The bolt 36 terminates in unthreaded end 38 which has a diameter just under the minor diameter of the thread of threaded opening 28. The bolt 36 need only be positioned with sufficient accuracy so that end 38 contacts tapered guide surface 26, it need not be aligned with the threaded opening 28.

The operation of the compliant engageable apparatus in mating with a misaligned bolt is illustrated in FIGS.

2 through 4. As bolt 36 is advanced, the off-center force on the floating member causes one side of spring 30 to compress more severely so that the floating member tilts toward the bolt. This brings threaded opening 28 toward the end 38 of the bolt until the end 38 is aligned with the threaded opening 28. As the bolt continues its advance, end 38 is inserted into the threaded opening bringing the threads of the bolt and the floating member into abutment. By rotating the bolt, these threads will then mate, as shown in FIG. 3, with the wings 24a, 24b, 24c, and 24d acting as drivers since they restrict rotation of the floating member within the housing. As the floating member is drawn in while the bolt is tightened, at least one wing will come into abutment with the surface of its receptor proximate the top surface 17 of the housing, this is illustrated as wing 24b in FIG. 3. This abutting wing will impart a torque between the floating member and the housing so that if either the bolt or housing yields to the torque, the floating member will return towards its floating position with all wings abutting the surface of the receptors proximate the top surface of the housing, as illustrated in FIG. 4.

If the floating member returns to the position shown in FIG. 4, the housing and floating member will have a predefined alignment and relative position. In the illustrative apparatus of FIG. 1, this predefined relative position is such that the axis of the floating member 14 and that of the cylindrical cavity 40 of the housing are coincident. If, therefore, the bolt is associated with one part and the engageable apparatus with another and one of two parts yield to the noted torque, the two parts may be joined with a predefined alignment and relative position. If neither part yields to the torque of a wing pressing against the surface of a receptor, then the engageable apparatus will not realign the parts, it will, however, still join the parts with the floating member retaining a cant within the housing, such as is illustrated in FIG. 3.

The spiral spring 30 is supported within the housing so that it also contributes a force which tries to restore the predefined lateral position of the floating member within the housing. Spiral spring 30 has the further advantage that it may collapse to a low profile during the mating operation. The opening 23 in the base plate 21 allows the end of the bolt to pass through the housing as the bolt is tightened.

Figure 4A:
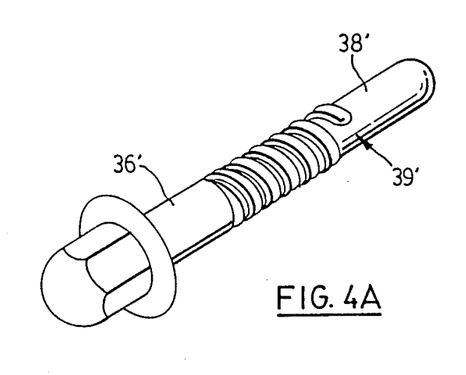
FIG. 4A is a perspective view of a portion of a preferred bolt for use with the apparatus of FIG. 1.

FIG. 4a illustrates a preferred bolt configuration. With a standard bolt, the thread terminates at a plane perpendicular to the shaft of the bolt such that the engageable tip of the thread is a half thread which presents a knife edge for engagement. The difficulty with this configuration is that the bolt will occasionally cross thread due to the half thread (which is weaker than a full thread) deforming on a non-meshing mating. In contrast, bolt 36' of FIG. 4a terminates in a full thread, the engaging tip 39' of which is radiused. The radius of tip 39' assists in meshing mating and, because the full thread is stronger than a half thread, resists cross threading. Bolt 36' terminates in unthreaded end 35' which is sized just under the minor diameter of the thread of threaded opening 28 of FIGS. 1 through 4. When employing bolt 36', the female thread of threaded opening 28 should be configured in like manner, terminating in a full thread with a radiused tip.

Figure 5:
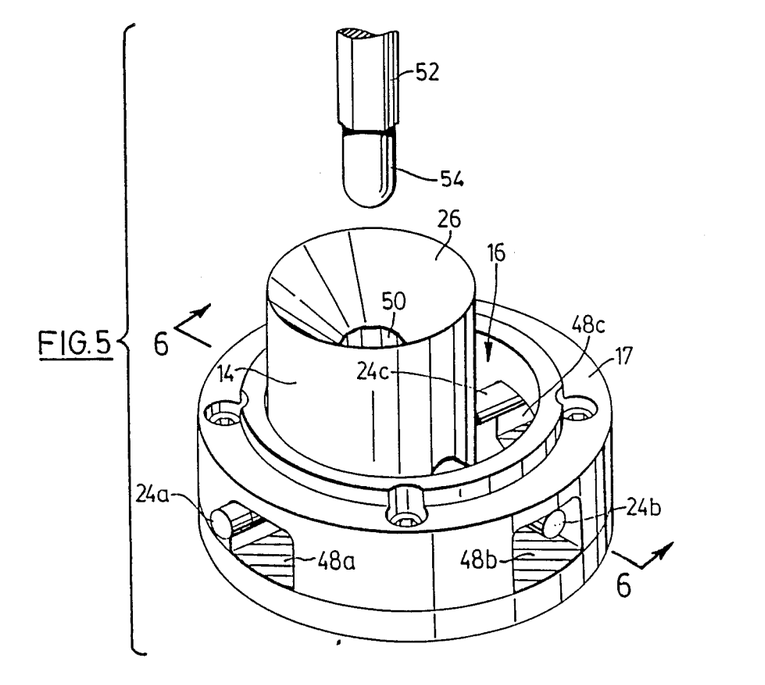
FIG. 5 is a perspective view of another embodiment of a compliant engageable apparatus according to this invention showing a driver element for use with the apparatus.

FIGS. 5 and 6 illustrate an alternate embodiment of the invention wherein threaded opening 28 of FIG. 1 has been replaced by multi-sided opening 50 and the outline of the side receptors 48a, 48b, 48c and 48d is generally rectangular. A long side of each rectangular receptor forms the surface of the receptor which is proximate the top surface 17 of the housing. In all other respects, the compliant engageable apparatus is identical with the apparatus 10 of FIG. 1 and like reference numerals have therefore been given to like parts.

The alternate embodiment of FIGS. 5 and 6 has particular application when it is desired to rotate a part affixed to the compliant engageable apparatus. As illustrated in FIG. 5, the rectangular side openings (receptors) permit the floating member 14 to retain a lateral offset within the top surface opening 16 even when the wings 24a, 24b, 24c, 24d are urged into abutment with the surface of the side openings proximate the top surface 17 of the housing. On the other hand, the side openings do ensure the floating member has a predefined alignment within the housing when the wings abut the surface of the side openings proximate top surface 17 of the housing. It should also be noted that spiral spring 30 will supply a force which urges the floating member to a predefined lateral position within the top surface opening.

To engage multi-sided opening 50, a multi-sided driver 52 is positioned such that end 54 thereof contacts the tapered guide surface 26. The driver is then advanced until the driver 52 and opening 50 are mated, as illustrated in FIG. 6. If the driver is then rotated, the wings act to rotate the housing of the compliant engageable apparatus which, in turn, rotates any part joined therewith.

Figure 7:
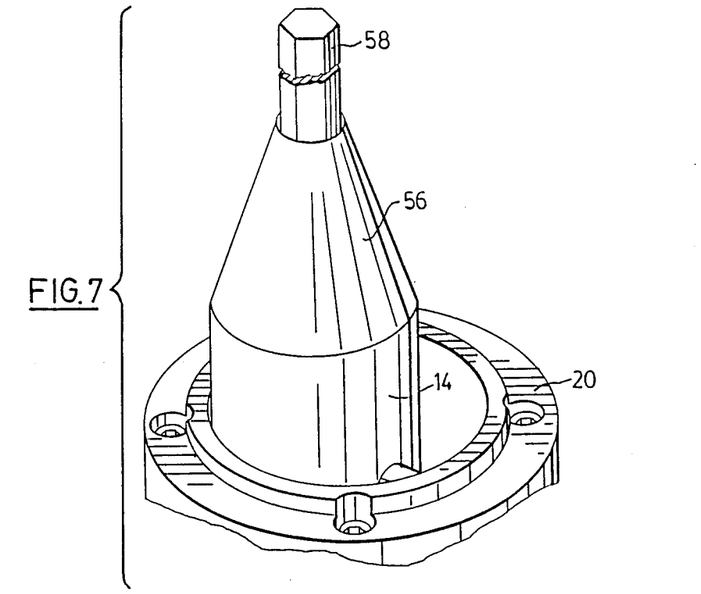
FIG. 7 is a perspective view of another embodiment of a compliant engageable apparatus made in accordance with this invention.

FIG. 7 shows another embodiment of the invention wherein the tapered guide surface 56 of floating member 14 is convex and terminates in multi-sided engaging means 58. The construction of housing 20 may be as illustrated in either FIGS. 1 or 5.

The compliant engageable apparatus of FIG. 7 is intended for use in driving a recessed element with a compatible multi-sided opening. In use, if the tapered guide surface 56 abuts the side of the recess containing the recessed element, the engaging means 58 will be either or both laterally offset and re-oriented to facilitate mating with the multi-sided opening of the recessed element.

Figure 7A:
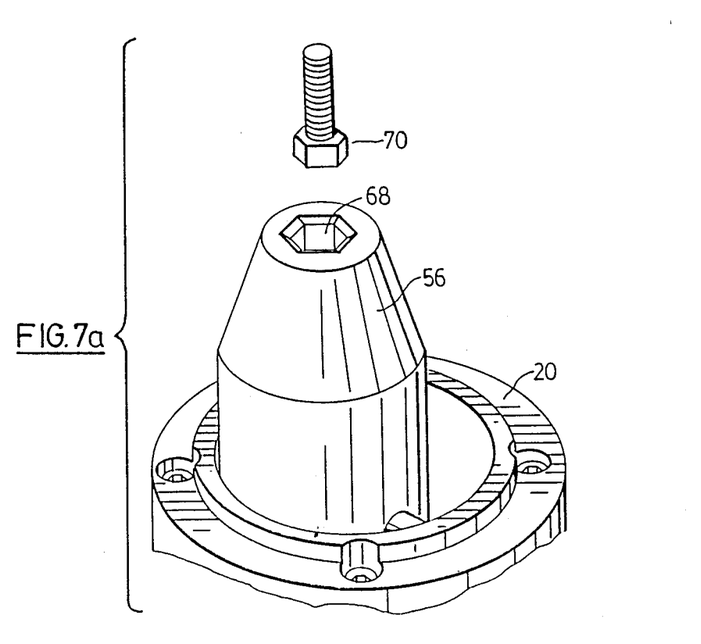
FIG. 7A is perspective view of modified embodiment of the compliant engageable apparatus of FIG. 7.

In the modified embodiment of FIG. 7 shown in FIG. 7a, the tapered guide surface 56 terminates in an engaging means which is a multi-sided opening 68. The multi-sided opening 68 is sized to engage the head of a screw, such as that illustrated as 70. This compliant engageable apparatus may then be used to insert into a recessed threaded opening.

Figure 8:
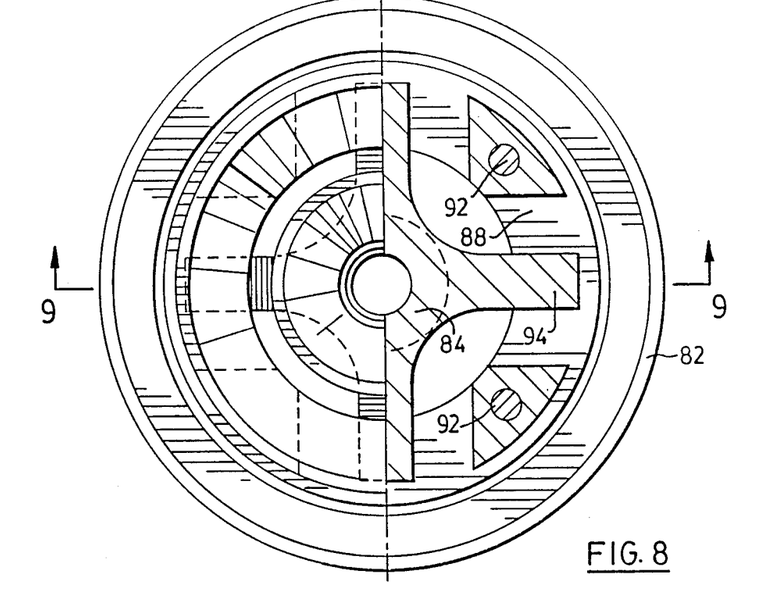
FIG. 8 is a half plan and half sectional view of an alternate compliant engageable apparatus according to this invention along the lines 8—8 FIG. 9.
Figure 9:
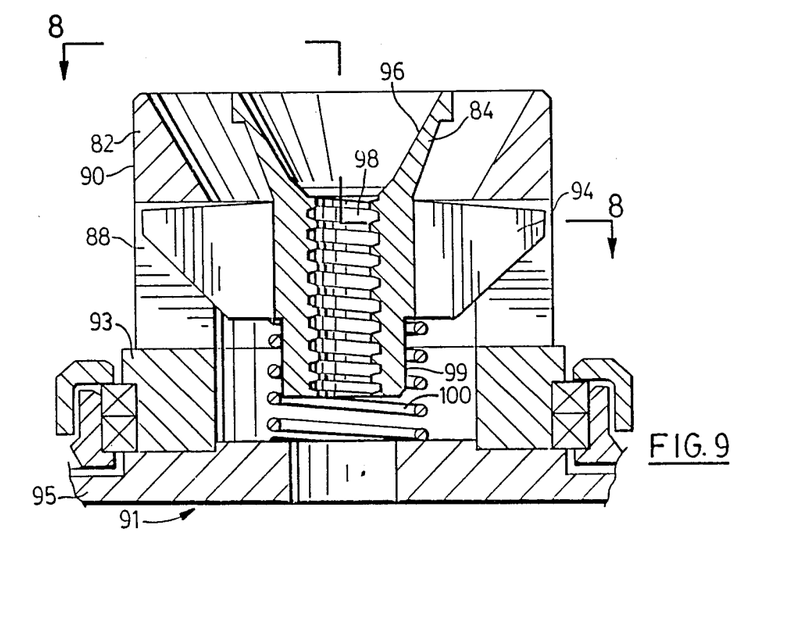
FIG. 9 is a side sectional view of the apparatus of FIG. 8 along the lines 9—9 of FIG. 8.

In the embodiment of FIGS. 8 and 9, the housing 82 has a generally cylindrical body 90 with rectangular notches in its base. A base 91 comprises a ring 93 and a base plate 95. Screws 92 hold the base 91 to the body 90 such that the rectangular notches in the body and the ring 93 form rectanuglar receptors 88 in the housing. A floating member 84 has integrally formed wings 94 which are received in the receptors 88 of the housing 82. An outwardly facing concave tapered guide surface 96 of the floating member terminates in a threaded engaging means 98. The base of the floating member comprises a cylindrical stub 99 which receives a cylindrical spring 100. Spring 100 is supported at its other end by base plate 95.

The bottom of wings 94 taper toward the side of the housing. This ensures the floating member may cant in the housing without interference between the wings and the surface of the receptors.

In operation, the floating member will move to guide a bolt, such as the one discussed in connection with the FIG. 1 embodiment, toward the engaging means 98 to permit mating. When the bolt is tightened there will be a torque between the wings and the housing to align the bolt with the axis of the housing, however, due to the rectangular outline of the receptors, the bolt may retain a lateral offset with respect to the axis of the housing.

Figure 10:
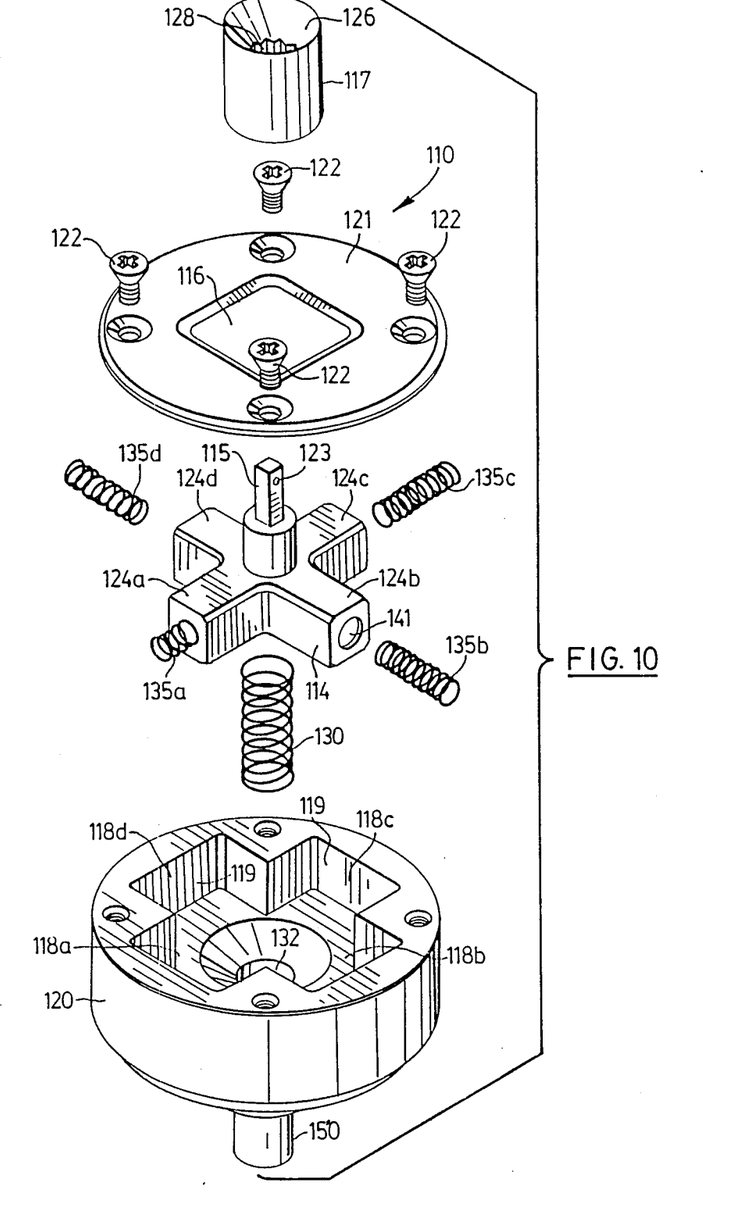
FIG. 10 is an exploded view of another embodiment of a compliant engageable apparatus made in accordance with this invention.

In FIG. 10 the compliant engageable apparatus 110 comprises a floating member 114 and a two piece housing comprising a cylindrical body 120 joined by screws 122 to a top plate 121 which forms the top surface of the housing. The housing has a square opening 116 through the top plate 121. The cylindrical body 120 has a cross-shaped central opening with the arms of the cross comprising side receptors 118a, 118b, 118c, and 118d. With the top plate 121 joined to the cylindrical body 120 of the housing, the side receptors are blind openings in the interior of the housing and have a generally rectangular outline. Additionally, the end face 119 of each side receptor is parallel to a side of the square top opening 116.

The floating member 114 has a cross-shaped lower section with the arms of the cross forming wings 124a, 124b, 124c, and 124d. The upper section of the floating member 114 comprises a stem 115 which projects through the opening 116 in the top plate of the housing. A head 117 is releasably retained on the stem by virtue of a conventional spring loaded bore bearing 123 in step 115. Head 117 terminates in outwardly facing tapered guide surface 126. The guide surface 126 tapers to engaging means 128 in the head.

The basal portion of a spring 130 is received in a cylindrical opening 132 in cylindrical body 120. The top of spring 130 abuts the back surface of floating member 114 so that spring 130 urges the floating member to a floating position at which the wings 124a, 124b, 124c, and 124d abut the interior surface of the top plate 121. In this position the axis of the floating member is aligned with the axis of the housing.

The end face of each wing 124a through 124d of floating member 114 has a cylindrical depression 141 which supports one end of a spring, 135a through 135d, respectively. Each spring 135a through 135d is compressed between the cylindrical depression 141 in the face of a wing 124a through 124d and the opposing end face 119 of a side receptor 118a through 118d. Springs 135a through 135d urge the floating member to a lateral equilibrium position with the housing. With the configuration of FIG. 10 and given identical springs, these springs will provide an aligning force which tend to center the floating member in the housing so that the axis of the floating member is coincident with the axis of the housing.

Shaft 150 of the compliant engageable apparatus 110 may be connected to a source of torque. Head 117 may be changed with another head so that the engaging means of the head match the engaging means of the element to be driven.

In operation, if the head of an element to be driven abuts guide surface 126, the floating member 114 will cant and/or laterally offset to permit mating. After mating, when torque is applied the housing will first pivot about its axis so that each wing of the floating member abuts a side of its side receptor and then the torque will be applied through the floating member to the driven element, with the floating member being free to vary its cant and lateral offset to permit driving off-axis and/or driving at an angle.

I claim:

1. A compliant engageable apparatus comprising:
   (a) a housing having an opening in its top surface opening and at least two receptors in its side;
   (b) a floating member received by said housing having a projecting end projecting through said top surface opening and having wings such that a wing is received by each of said receptors, said projecting end having a tapered guide surface, said tapered guide surface tapering to engaging means, and
   (c) urging means to urge said floating member to a floating position at which said wings abut the surface of said receptors which is proximate the top surface of said housing whereby said floating member has a preset aligment within said housing.

2. The compliant engageable apparatus of claim 1 wherein said tapered guide surface of said floating member is concave and said engaging means are female.

3. The compliant engageable apparatus of claim 2 wherein said female engaging means of said floating member are a female thread.

4. The compliant engageable apparatus of claim 2 wherein said female engaging means of said floating member are a female multi-sided shaft.

5. The compliant engageable apparatus of claim 4 wherein said concave tapered guide surface is frusto-conical.

6. The compliant engageable apparatus of claim 1 wherein said tapered guide surface of said floating member is convex and said engaging means are male.

7. The compliant engageable apparatus of claim 6 wherein said male engaging means are a male multi-sided shaft.

8. The compliant engageable apparatus of claim 7 wherein said convex tapered guide surface is frusto-conical.

9. The compliant engageable apparatus of claim 1 wherein said tapered guide surface of said floating member is convex and said engaging means are female.

10. The compliant engageable apparatus of claim 9 wherein said female engaging means are a multi-sided shaft.

11. The compliant engageable apparatus of claim 10 wherein said convex tapered guide surface is frusto-conical.

12. The compliant engageable apparatus of claim 1 wherein said receptors are openings in the wall of said housing.

13. The compliant engageable apparatus of claim 1 wherein said receptors are equally spaced about the periphery of said housing.

14. The compliant engageable apparatus of claim 13 wherein said wings are cylindrical shafts.

15. The compliant engageable apparatus of claim 13 wherein said receptors comprise four receptors whereby adjacent receptors are at right angles.

16. The compliant engageable apparatus of claim 1 wherein said receptors are generally rectangular in outline with said surface of said receptors which is proximate the top surface of said housing defined by a side of said rectangular outline, whereby said wings may move laterally in said receptors so that said floating member may be laterally offset within said top surface opening.

17. The compliant engageable apparatus of claim 16 wherein said receptors are blind openings in the interior of said housing and including a spring compressed between the blind face of each receptor and the end face of the wing received by the receptor whereby said floating member is laterally urged to an equilibrium position within said housing.

18. The compliant engageable apparatus of claim 1 wherein said receptors are generally triangular in outline with said surface of said receptors which is proximate the top surface of said housing defined by the vertex of the triangular outline so that said urging means urge said wings of said floating member into abutment with said receptors proximate the vertex of said triangular outline whereby said floating member is positioned at a set lateral position within said top surface opening.

19. The compliant engageable apparatus of claim 16 wherein said urging means is a spring within said housing between the base of said housing and the body of said floating member with the base of said spring supported within said housing concentrically with said top surface opening and the apex of said spring retained by the body of said floating member whereby said spring tends to centre said floating member in said top surface opening.

20. The compliant engageable apparatus of claim 19 wherein said spring is a spiral spring.

21. The compliant engageable apparatus of claim 18 wherein said urging means is a spring within said housing between the base of said housing and the body of said floating member with the base of said spring supported within said housing concentrically with said top surface opening and the apex of said spring retained by the body of said floating member whereby said spring tends to centre said floating member in said top surface opening.

22. The compliant engageable apparatus of claim 21 wherein said spring is a spiral spring.

23. A compliant engageable apparatus comprising:
(a) a housing having an opening in its top surface opening and at least two receptors in its side;
(b) a floating member received by said housing having a projecting stem projecting through said top surface opening and having wings such that a wing is received by each of said receptors, said projecting stem of said floating member for engagement with one end of a head having, at its other end, a tapered guide surface tapering to engaging means, and
(c) urging means to urge said floating member to a floating position at which said wings abut the surface of the receptors which is proximate the top surface of said housing whereby said floating member has a preset alignment within said housing.

* * * * *